Jan. 5, 1971  J. A. MILLER ET AL  3,553,700
AIRCRAFT ANTENNA WITH VIBRATION DAMPING
Filed March 6, 1969
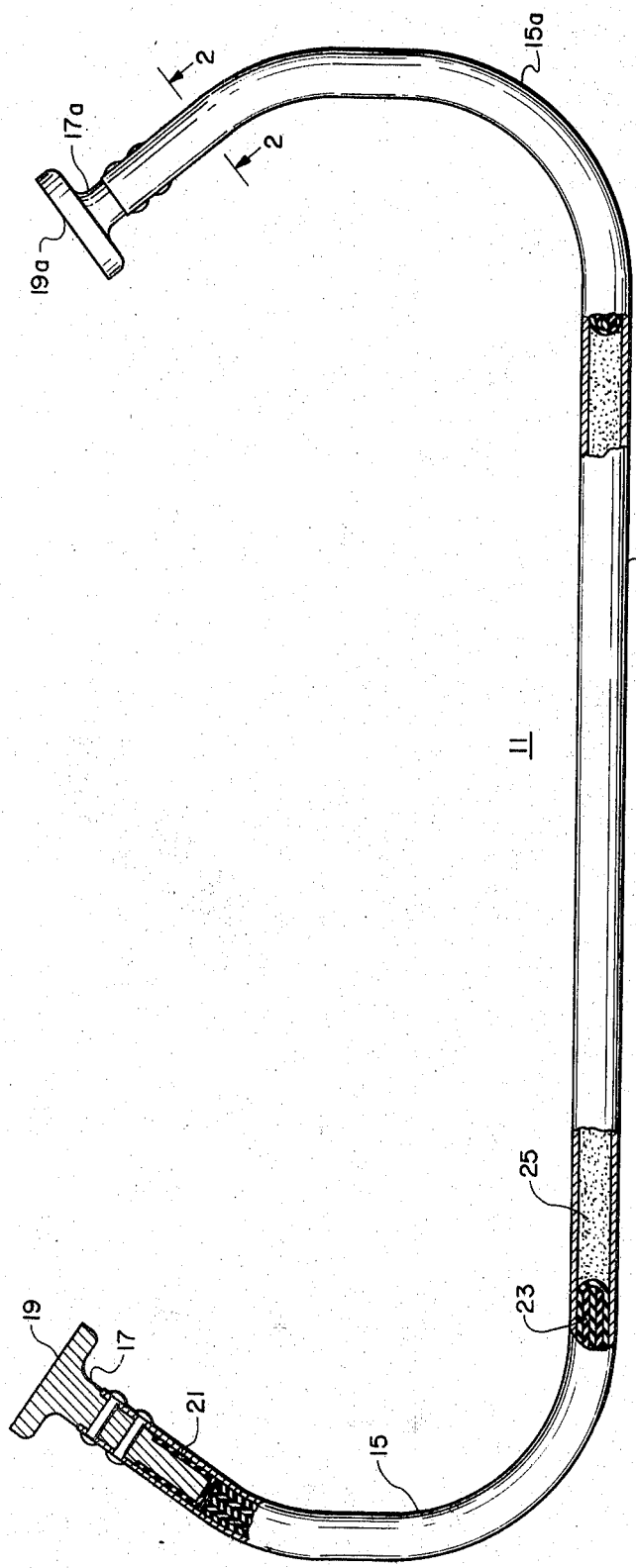
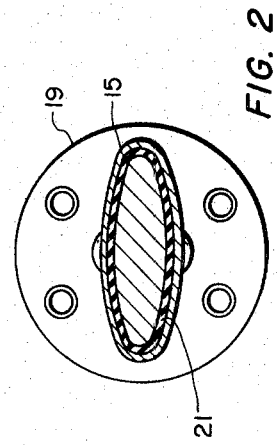
INVENTORS
JOHN A. MILLER
POWELL J. POCSI
BY: Melton M. Davis
Harry M. Saragovitz,
Edward J. Kelly &
Herbert Berl  ATTORNEYS.

United States Patent Office 3,553,700
Patented Jan. 5, 1971

3,553,700
AIRCRAFT ANTENNA WITH VIBRATION DAMPING
John A. Miller, Morganville, and Powell J. Pocsi, Plainfield, N.J., assignors to the United States of America as represented by the Secretary of the Army
Filed Mar. 6, 1969, Ser. No. 804,883
Int. Cl. H01g 1/28
U.S. Cl. 343—705                                4 Claims

ABSTRACT OF THE DISCLOSURE

The invention herein relates to a half-loop antenna such as installed on aircraft bodies. The antenna described is made of tubular conductive metal having an elongated base relative to short arms which are secured to the aircraft body, and wherein the tubular body is filled with an acceleration damper contained in the region of greatest flexure to provide the most advantageous damping characteristics.

---

The invention described herein may be manufactured, used and licensed by or for the Government for governmental purposes without the payment to us of any royalty thereon.

BACKGROUND OF THE INVENTION

In all types of aircraft antennas are conventionally secured to the body of the aircraft. A major obstacle to the efficient functioning of such an antenna is the undue vibration imparted thereto, particularly in high-speed fixed-wing aircraft. An aircraft environment is composed of various forces which affect any device, such as an antenna, mounted upon or within the aircraft structure. Antennas of the half-loop type are mounted upon the aircraft skin and the environmental forces include aerodynamic as well as vibration loads. Accordingly, it has been found that efficient damping means must be provided to prevent any undue vibration of the antenna in order to secure optimum operating efficiency therefrom.

Various expedients have been used in the past to minimize or eliminate vibrations which may adversely affect the operational characteristics of the antenna. One such means consisted in making the antenna of a solid plastic that had metallic wires wrapped about the body thereof. The major objection to such form of structure was that sufficient and effective damping could not be achieved for antennae of a leg-to-leg distance greater than 24 inches.

The primary object of the present invention is to provide a half-loop antenna that provides excellent damping characteristics.

Another object of the invention is the provision of an antenna that is capable of passing rigid environmental tests, and will not be adversely affected by undue shock, vibration, humidity or fungus conditions.

Another object of the invention is the provision of an antenna that can be readily fabricated and easily affixed to the skin of an aircraft body.

SUMMARY OF THE INVENTION

There is herein described a tubular half-loop antenna adapted for attachment to an aircraft having an elongated base relative to short arms wherein the damping characteristics are greatly enhanced by partially filling the elongated arm with random particles of sand, quartz or similar material, the arcuate tubular sections with a resin like material, such as fiberglass, and the provision of rubber like envelopes about the foot portions of the antenna that are used for attachment to a base affixed to the aircraft body.

BRIEF DESCRIPTION OF THE DRAWINGS

In the drawing, FIG. 1 is an elevational view, partly broken away, of the preferred embodiment of the invention; and FIG. 2 is a sectional view taken on the line 2—2 of FIG. 1.

DETAILED DESCRIPTION OF THE PREFERRED EMBODIMENT

FIG. 1 shows one embodiment of the antenna assembly designated generally as 11. The antenna body is elliptical in configuration throughout its entire length. The preferred configuration of such elliptical shape is a 3 to 1 ratio of major to minor axes. Thus in one specific embodiment the tubular antenna had a major axes of 1.5 inches and a minor axis of 0.575 inch and a wall thickness of .058 inch. Such elliptical configuration is clearly shown in FIG. 2 of the drawing. The antenna proper includes an elongated base section 13 and relative short arms 15, 15a that are substantially perpendicular to the base 13. Each end of the tubular antenna is provided with an individual mounting foot shown as 17, 17a. Each mounting foot is of one piece construction and terminates in an enlarged face portion 19, 19a adapted to engage a base that is secured to the aircraft skin.

To provide the desired and excellent damping characteristics and properties the following means are employed. Each foot 17 is enveloped by a solid rubber boot of rubber or like material. The arcuate arm 15 is filled with sheets 23 of fiberglass or like material which has been first dipped in an epoxy glue. The sheets 23 are placed within the arm 15 so as to extend from the confined terminus of the foot 17 within the arm 15 to a short distance beyond the bend of the arm. A similar arrangement of fiberglass is provided in the arm 15a. The elongated base 13, which is the area of greatest flexure during flight of the aircraft is partially filled with loosely packed, granular, rounded sand, quartz or like material. A particular material found to be effective for such purpose is medium grit "Wasaw" quartz sand which has been first heated to drive off moisture. It has been found that relative motion between the particles of sand and the antenna walls provide excellent damping characteristics wherein energy is dissipated by random collisions.

We wish it to be understood that we do not desire to be limited to the exact details of construction shown and described, for obvious modifications will occur to a person skilled in the art.

What is claimed is:

1. An antenna adapted to be affixed to an aircraft comprising an electrically conductive tubular element having a substantially U shaped configuration and being substantially elliptical in cross section, said U shaped configuration comprising an elongated base relative to a pair of short arms adapted for engagement to said aircraft, said arms being completely filled with a resin like material and said elongated base being filled with particles of a shock absorbent granular material.

2. An antenna of the kind described in claim 1 wherein the elliptical cross section ratio of the major to minor axes is substantially three to one.

3. An antenna of the kind set forth in claim 1 wherein the filling material of said arms comprises epoxy resin coated fiberglass.

4. An antenna of the kind set forth in claim 1 wherein the filling material of the elongated base comprises loosely packed sand.

References Cited

UNITED STATES PATENTS 2,714,161  7/1955  Featherstun _____ 343—904

FOREIGN PATENTS 504,587  7/1954  Canada _____ 343—904

ELI LIEBERMAN, Primary Examiner

U.S. Cl. X.R.

343—741, 904